Figure 1:
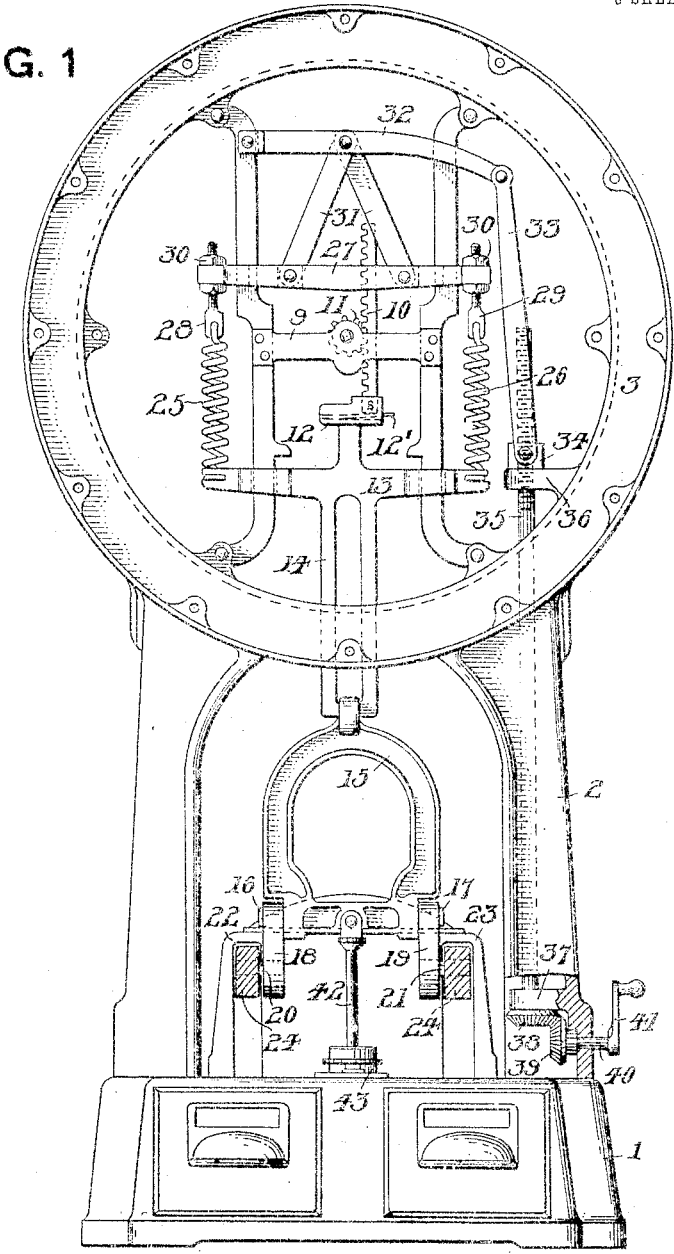

J. H. OHNSMAN.
AUTOMATIC COMPUTING AND WEIGHING SCALE.
APPLICATION FILED AUG. 15, 1907.

1,040,000.

Patented Oct. 1, 1912.

3 SHEETS—SHEET 1.

WITNESSES.

INVENTOR.

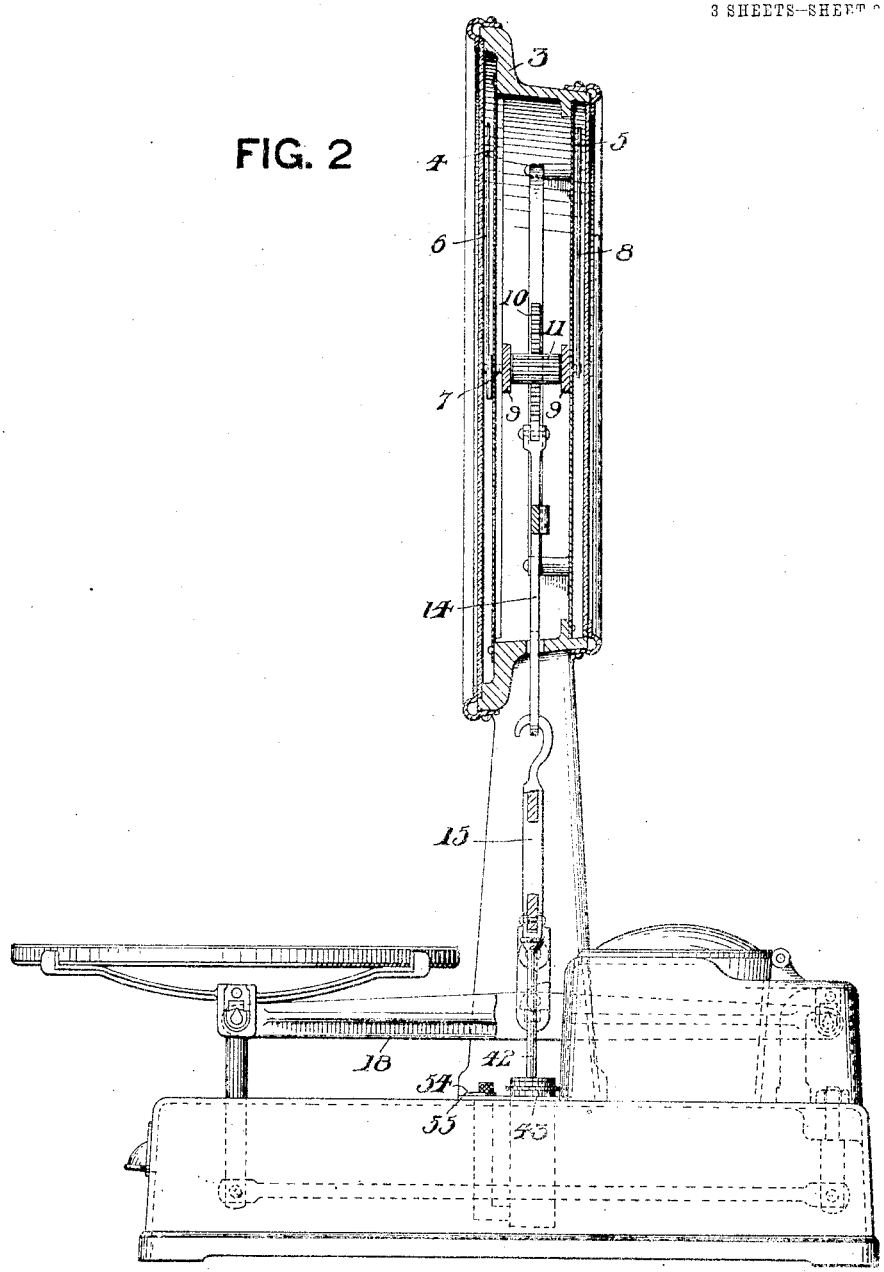

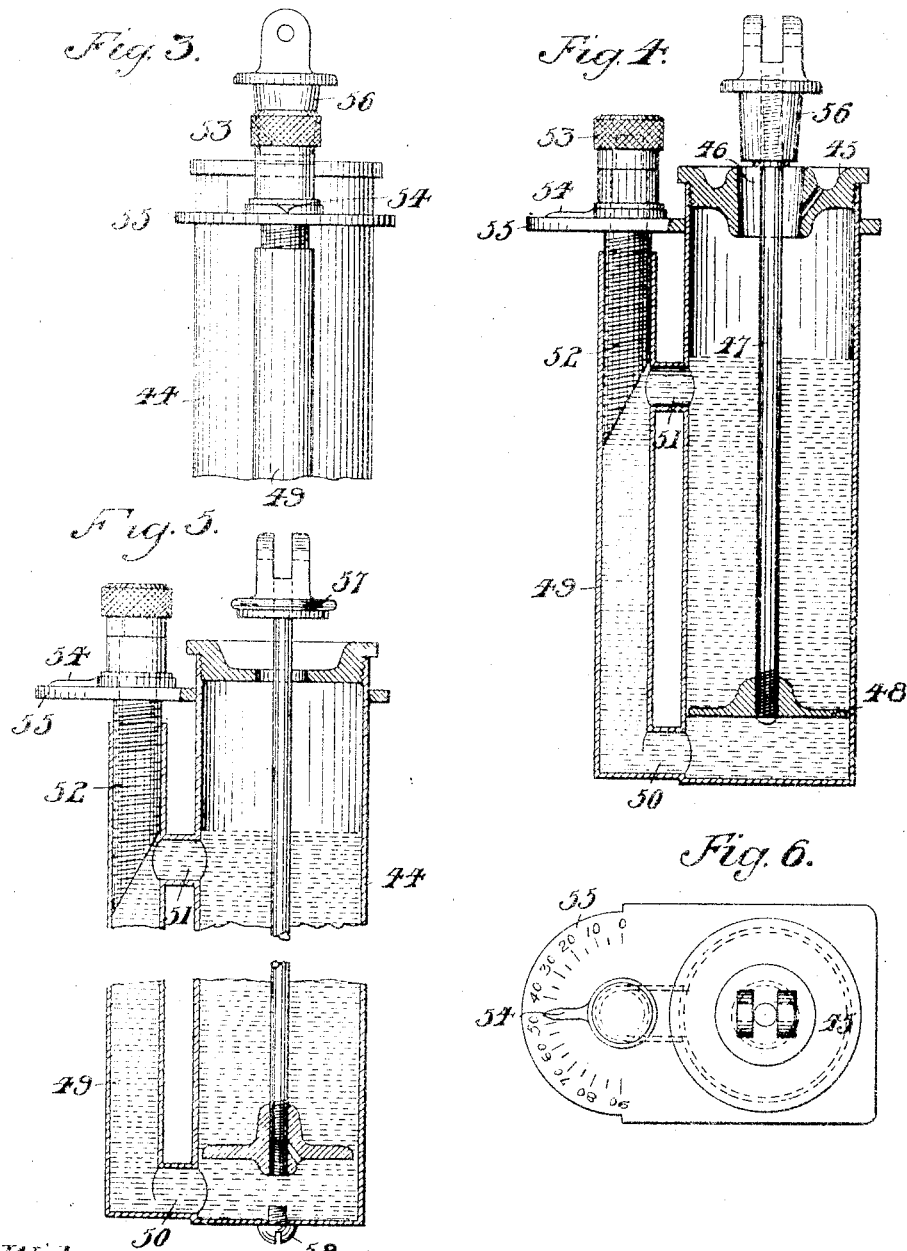

UNITED STATES PATENT OFFICE.

JOHN H. OHNSMAN, OF BEAVER FALLS, PENNSYLVANIA, ASSIGNOR TO NATIONAL SCALE COMPANY, OF CHICOPEE FALLS, MASSACHUSETTS, A CORPORATION OF MASSACHUSETTS.

AUTOMATIC COMPUTING AND WEIGHING SCALE.

1,040,000.  Specification of Letters Patent.  Patented Oct. 1, 1912.

Application filed August 15, 1907. Serial No. 388,307.

*To all whom it may concern:*

Be it known that I, JOHN H. OHNSMAN, a citizen of the United States, residing at Beaver Falls, in the county of Beaver and State of Pennsylvania, have invented a new and useful Improvement in Automatic Computing and Weighing Scales, of which improvement the following is a specification.

My invention relates to improvements in scales and particularly to computing counter scales.

The object of my invention is to produce an automatic weighing and computing scale in which the bearings for the lever are placed intermediate the length thereof: a means or quick stop mechanism provided to prevent the annoying vibrations or oscillations of the pointer which occur at the completion of each weighing operation in the use of the ordinary scales; means to bring the scales to balance at zero, and at the same time take the tare whenever necessary to do so, and other novel features of construction hereinafter more specifically described, reference being had to the accompanying drawings, forming part hereof, in which—

Figure 1 is a front elevation of my improved scales. Fig. 2 is a side elevation of the same. Fig. 3 is a fragmentary elevation of the quick stop cylinder. Fig. 4 is an elevation in section of the same. Fig. 5 is a sectional elevation showing a modified means to secure the piston in said cylinder. Fig. 6 is a plan view of the cylinder.

Referring to said drawings, 1 is the base of the scale upon which is secured the standard 2 which comprises columns which project upwardly from said base and to or upon the upper end of which is secured the dial frame 3. The said dial frame comprises an annular ring and the dials 4, 5, which are suitably secured in said ring. The said dial 4 is provided around the edge circumferentially thereof with flanges indicating pounds and fractions thereof, which are indicated by the pointer 6 mounted on one end of the short shaft 7, the opposite end of which carries a similar pointer 8 which indicates on the dial 5 the weight and also the value of the article or thing being weighed, the said dial having figures marked thereon which designate the weight of the article, the price per pound and the value thereof. The said shaft 7 is mounted in bearings formed in the cross pieces 9, and is operated by a vertically disposed rack 10 which meshes with the toothed roller 11 rigidly mounted on said shaft 7. The said rack is seated in a socket formed in one end of the cross bar 12 and rests upon a spring seat 12' seated in said socket, the upward pressure of which serves to keep said rack in constant mesh with the roller 11. The said cross bar 12 is integral with or connected to the head 13, the lower portion of which constitutes a link 14 which is connected with the hook on the upper end of the draft rod 15.

The draft is in the form of an inverted U the lower ends of which are hung upon the knife bearings 16, 17, formed in the links 18 and 19, respectively, in the lower end of which respectively is secured short rods 20 and 21, which are provided with knife bearings 22, 23, upon which the balance bar 24 of the scales is supported, being held balanced thereon by the upward pull of the springs 25, 26, the lower ends of which are connected to the head 13, and the upper ends with the cross piece 27, by means of the screw bolts 28, 29, on which are mounted tension nuts 30, whereby the tension of said springs may be varied. The said cross piece 27 is supported by the bars 31, being pivotally connected therewith, the said bars are pivotally connected to the arm 32 one end of which is pivotally secured within the dial frame, and the opposite end thereof to the vertically disposed member 33 which is pivotally connected to the nut 34 movable on the tare rod 35, which is mounted in bearings formed in the brackets 36, 37, projecting from, respectively, the dial frame and one of the standard columns. The upper end of said tare rod is screw threaded and the lower end thereof has mounted thereon the bevel wheel 38, which meshes with a similar bevel wheel 39 on the shaft 40 which is adapted to be actuated by the hand crank 41 for the purpose of causing the nut to elevate and lower if desired the member 33 whereby the rack is operated in either direction desired through the cross head and connecting mechanism for the purpose of adjusting the indicator pointers at zero or to take tare. The lower end of the draft rod is connected with the upper end of the piston 42 of the pump 43.

In Figs. 3 to 6 inclusive, is shown the quick stop mechanism, which comprises a cylinder 44, the upper end or top of which is closed by a cap 45, in which an orifice 46 is formed, through which the piston 47 projects, the lower end of which carries a piston head 48. The upper end of said piston is connected with the draft rod of the scales. The said cylinder is connected to and communicates with a supplemental chamber 49 by means of the channels 50 and 51, and the flow of liquid contained in said cylinder (which is an oil not readily frozen or congealed) from said cylinder into the supplemental chamber is controlled by the threaded shaft or rod 52, which is capable of operation by the knob 53 on the upper end thereof. An indicator finger 54 mounted upon said rod serves to indicate on the dial 55 the degree of movement imparted to said rod for the purpose of regulating the flow of fluid between the cylinder and chamber dependent upon the liquidness or viscousness thereof. The opening or orifice 46 in the cap 45 is capable of being closed by the stopper 56, or the cap 57. In closing the cylinder shown in Fig. 4, the piston head is forced to the bottom of the cylinder and the stopper is secured in said orifice. In the form shown in Fig. 5 the piston which is hollow and screw threaded at the lower end is screwed upon the screw 58 in the bottom of the cylinder whereby the orifice is closed by the cap 57.

I claim as my invention and desire to secure by Letters Patent:

In a computing and weighing scale, the combination of a base, a dial frame mounted on said base, indicators operable around said dial, a draft rod, a balance lever supported in said base and connected at a point substantially intermediate of its length to said draft rod, means actuated by the movement of said draft rod for operating the indicators, means directly connected with said draft rod for preventing the oscillation of the indicators after the completion of the weighing operation, and means for adjusting the indicators to zero and for taking tare.

In testimony whereof, I have hereunto signed my name in the presence of two subscribing witnesses.

JOHN H. OHNSMAN.

In the presence of—
CLARENCE A. WILLIAMS,
JAMES C. HERRON.